US010926463B2

(12) United States Patent
August et al.

(10) Patent No.: US 10,926,463 B2
(45) Date of Patent: Feb. 23, 2021

(54) GROOVED GUIDE FOR PROVIDING FILAMENT

(71) Applicant: Arevo, Inc., Santa Clara, CA (US)

(72) Inventors: Zachary Aaron August, Santa Clara, CA (US); Erik Oscar Sunden, San Francisco, CA (US)

(73) Assignee: Arevo, Inc., Milpitas, CA (US)

( * ) Notice: Subject to any disclaimer, the term of this patent is extended or adjusted under 35 U.S.C. 154(b) by 242 days.

(21) Appl. No.: 15/948,336

(22) Filed: Apr. 9, 2018

(65) Prior Publication Data

US 2019/0160742 A1     May 30, 2019

Related U.S. Application Data

(62) Division of application No. 15/827,721, filed on Nov. 30, 2017, now Pat. No. 10,076,870.

(51) Int. Cl.
*B29C 64/205* (2017.01)
*B29C 64/268* (2017.01)
(Continued)

(52) U.S. Cl.
CPC .......... *B29C 64/205* (2017.08); *B29C 64/106* (2017.08); *B29C 64/118* (2017.08);
(Continued)

(58) Field of Classification Search
CPC ............................ B29C 64/205; B29C 64/321
See application file for complete search history.

(56) References Cited

U.S. PATENT DOCUMENTS 5,970,752 A    10/1999   Cusick et al.
7,938,351 B2    5/2011   Taatjes et al.
(Continued)

FOREIGN PATENT DOCUMENTS

DE    10 2014 004011 A1    9/2015
EP    3 124 212 A2    2/2017

OTHER PUBLICATIONS

Ahmed NPL 2017 https://3dprinting.com/news/mit-engineers-develop-high-speed-laser-assisted-fdm-printer/ (Year: 2017).*
(Continued)

*Primary Examiner* — Leith S Shafi
*Assistant Examiner* — Nicholas R Krasnow
(74) *Attorney, Agent, or Firm* — McGeary Cukor, LLC; Kenneth Ottesen; Jason Paul Demont

(57) ABSTRACT

A filament guide that guides thermoplastic filament to an object being manufactured. A deposition head comprising the disclosed filament guide provides a filament to the intended deposition point. The filament guide comprises a guide member having a filament groove configured to guide the filament along a path of travel. The groove has an upstream end that is configured to receive the filament from a source and a downstream end that is configured to direct the filament toward the deposition point in the intended direction. A notch at the downstream end of the guide member enables the filament to travel toward the deposition point. The portions of the guide member on either side of the notch act to keep the filament centered laterally. A plate that is transparent to electromagnetic radiation from a heat source covers the groove and permits the electromagnetic radiation to reach the filament while providing added support.

6 Claims, 10 Drawing Sheets

(51) Int. Cl.
  *B33Y 30/00* (2015.01)
  *B29C 64/321* (2017.01)
  *B29C 64/106* (2017.01)
  *B29C 64/218* (2017.01)
  *B29C 64/209* (2017.01)
  *B29C 64/118* (2017.01)
  *B29K 101/12* (2006.01)

(52) U.S. Cl.
  CPC .......... *B29C 64/209* (2017.08); *B29C 64/218* (2017.08); *B29C 64/268* (2017.08); *B29C 64/321* (2017.08); *B33Y 30/00* (2014.12); *B29K 2101/12* (2013.01)

(56) References Cited

U.S. PATENT DOCUMENTS

| | | | |
|---|---|---|---|
| 2014/0234625 A1 | 8/2014 | Suzuki | |
| 2014/0263534 A1* | 9/2014 | Post | B29C 64/209 226/196.1 |
| 2014/0322383 A1* | 10/2014 | Rutter | B29C 64/227 425/500 |
| 2015/0352789 A1* | 12/2015 | Haider | B29C 64/386 264/129 |
| 2015/0367576 A1 | 12/2015 | Page | |
| 2016/0271876 A1 | 9/2016 | Lower | |
| 2016/0339634 A1 | 11/2016 | Fuller | |
| 2017/0072613 A2 | 3/2017 | Bracha et al. | |
| 2017/0151704 A1 | 6/2017 | Go et al. | |
| 2017/0259502 A1 | 9/2017 | Chapiro et al. | |

OTHER PUBLICATIONS

Notice of Allowance, Notice of Allowability, U.S. Appl. No. 15/827,721, dated Aug. 10, 2018. This is the parent application of the present application.

Officer Luis Martins Lopes, Written Opinion of ISA, International Application No. PC/US2018/058159, dated Jan. 30, 2019.

Officer Luis Martins Lopes, International Search Report, International Application No. PC/US2018/058159, dated Jan. 30, 2019.

WIPO, International Preliminary Report on Patentability, International Application No. PCT/US2018/058159, dated Jun. 2, 2020.

* cited by examiner

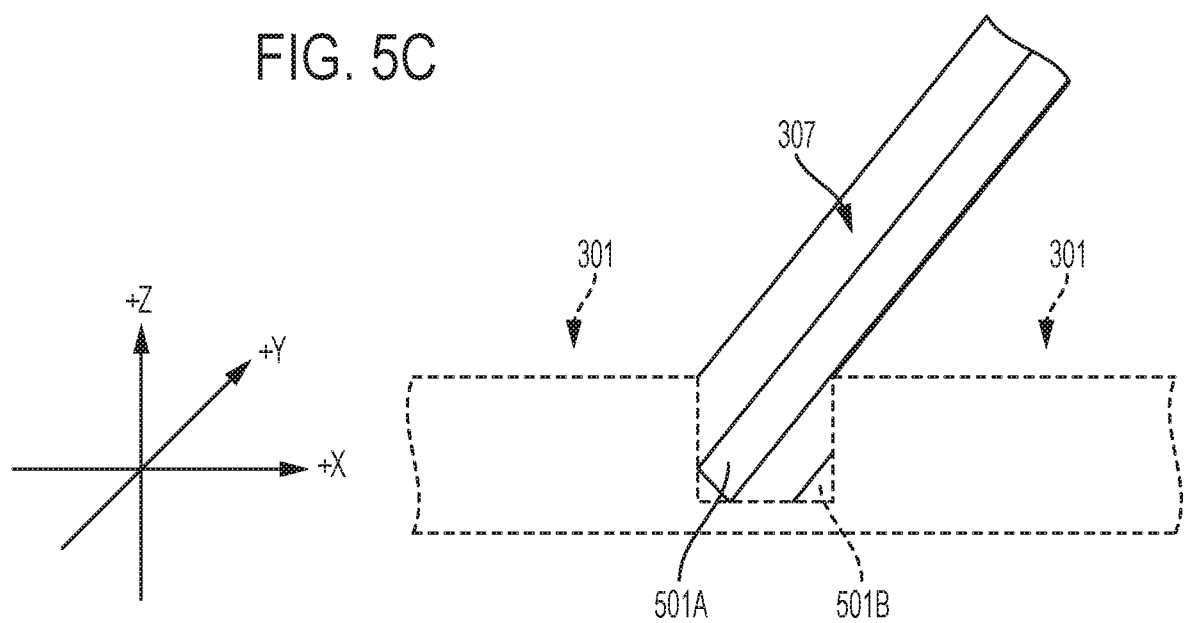

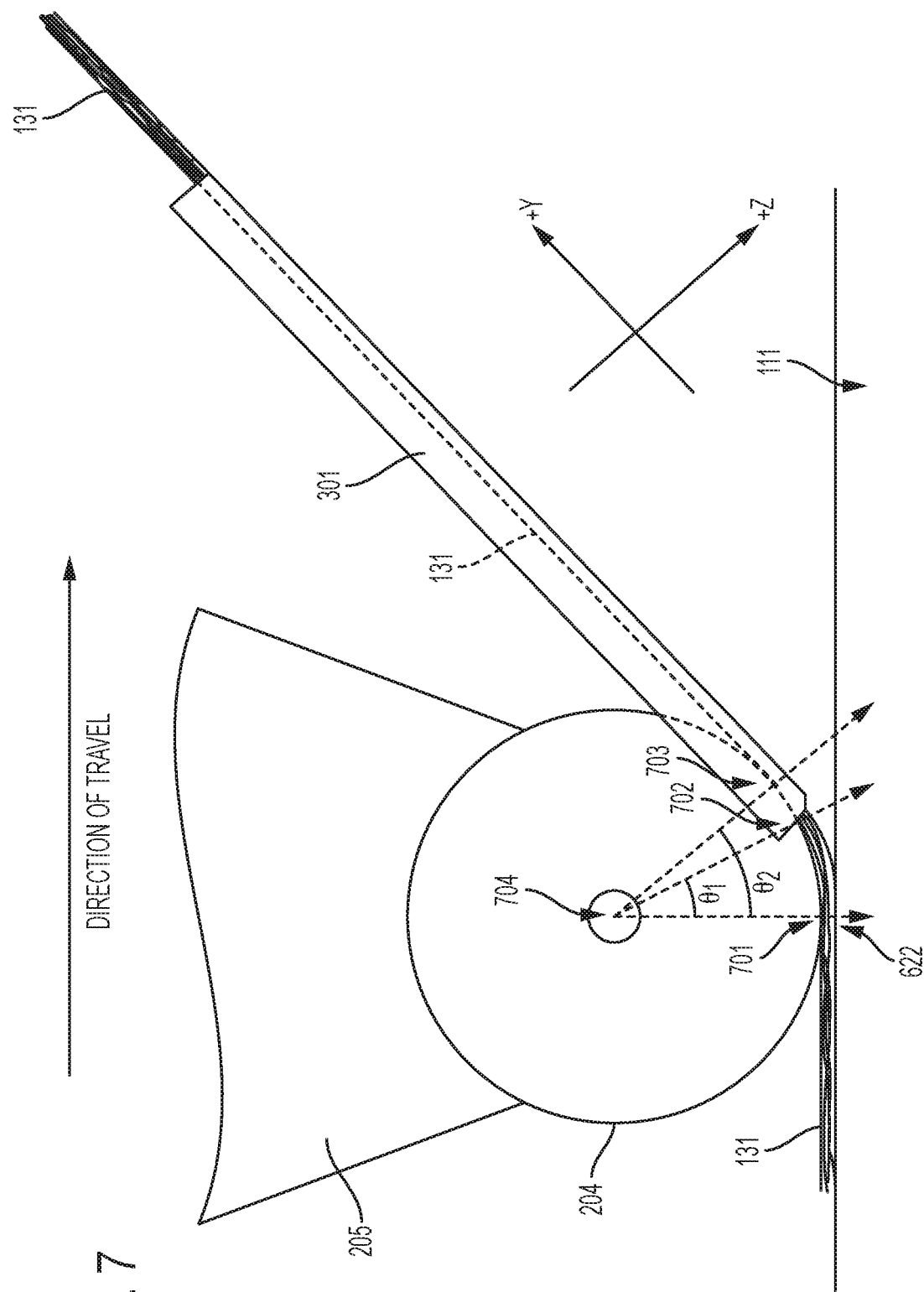

GROOVED GUIDE FOR PROVIDING FILAMENT

CROSS-REFERENCE TO RELATED APPLICATION(S)

This application is related to U.S. patent application Ser. No. 15/827,721, filed on Nov. 30, 2017, which is incorporated herein by reference.

FIELD OF THE INVENTION

The present invention relates to additive manufacturing of three-dimensional object in general, and, more particularly, to a filament guide for guiding a thermoplastic filament toward an object being manufactured.

BACKGROUND

In general, there are two complementary approaches to manufacturing an object: additive manufacturing and subtractive manufacturing.

Additive manufacturing involves aggregating material to form the desired object. In contrast, subtractive manufacturing involves removing material to form the desired object. In practice, many objects are manufactured using a combination of additive and subtractive techniques.

A form of additive manufacturing—colloquially known as "three-dimensional (3D) printing"—is the subject of intense research and development because it enables objects with complex geometries to be manufactured without molds or dies. Furthermore, 3D printing enables the mass customization of objects with different dimensions and characteristics.

In at least one 3D printing technique, the object is built by providing a thermoplastic filament to a deposition head on a robotic arm. The thermoplastic filament comprises a continuous tow of carbon fibers that is impregnated with thermoplastic. The deposition head heats and deposits the thermoplastic filament as one or more runs of material, via a roller. After it is deposited, each run quickly solidifies and fuses with the runs that it touches. The technique builds a three-dimensional object from a mathematical model of the object.

In order to build the object to within the tolerances specified in the model, the deposition head must continuously provide proper guidance of the filament to the correct positions on the object being manufactured. At the same time, in order to heat the thermoplastic while not adversely affecting the carbon fibers in the filament, the deposition head must heat the filament correctly. The deposition head does this typically by providing sufficient exposure of the filament to a directed and carefully regulated heat source. However, exposing the filament too much, for heating purposes, can result in the filament traveling unrestricted over a significant distance, in particular from the heated portion to the roller, potentially and adversely affecting the build quality of the object being manufactured.

What is needed is a system for guiding the filament to the correct positions on the object being manufactured, without at least some of the disadvantages in the prior art.

SUMMARY OF THE DISCLOSURE

The present invention enables a deposition head in an additive manufacturing system to guide thermoplastic filament to an object being manufactured. In particular, a deposition head comprising the filament guide of the illustrative embodiment is capable of providing a filament to the intended deposition point under a roller. The filament guide comprises a guide member having a filament groove that is configured to guide the filament along a path of travel. The filament is guided along the path of travel at a feed velocity provided by a filament drive. The filament groove has an upstream end (or "first end") that is configured to receive the filament from a source, such as the filament drive, and a downstream end (or "second end") that is configured to direct the filament toward the deposition point in the intended direction.

A notch at the lower end of the guide member enables the filament, when bent via heating, to travel toward the deposition point. The portions of the guide member on either side of the notch act to keep the filament centered laterally, thereby further directing the filament toward the intended deposition point. In particular, this arrangement can prevent, or at least reduces, lateral drift of the filament when it is deposited in a curve.

The filament guide further comprises a plate that is substantially transparent to the electromagnetic radiation that is emitted by a heat source and that is used to heat the filament. In accordance with the illustrative embodiment, the plate is made of fused quartz when, for example and without limitation, the heat source is a laser that emits infrared radiation. The plate covers at least a lower portion of the guide member, including the filament groove that accommodates a filament traveling in the groove toward the deposition point. The plate is disposed on the anterior surface of the guide member such that the plate retains the filament within at least a portion of the filament groove, while permitting the filament to be heated by the heat source.

In some embodiments of the present invention, the guide member has a rear surface in which a cavity is formed, wherein the cavity is shaped to accommodate the roller on the deposition head. The roller presses the filament to a surface (i.e., of the object) at the deposition point. The guide member can also have a beveled edge, or a chamfered edge, adjacent to the cavity, such that the edge conforms to a surface proximal to the deposition point. The beveled edge, cavity, and notch features of the filament guide enable at least one point on the guide member to extend past the initial point of contact of the filament with the roller, toward the deposition point.

Advantageously, a deposition head comprising the filament guide of the illustrative embodiment enables the heat source to heat sufficiently the thermoplastic in the filament to enable it to bend for pressing by the roller, while providing sufficient guidance to the filament to minimize movement away from the intended deposition point, including minimizing lateral movement with respect to the intended direction of the run of material.

The filament guide of the illustrative embodiment is described in the context of guiding thermoplastic filament toward a deposition point in an additive manufacturing system. As those who are skilled in the art will appreciate, however, after reading this specification, the disclosed filament guide can be used in various other applications, and with either filaments or other slender threadlike objects or fibers.

An illustrative apparatus for additive manufacturing with a filament comprises: a filament drive configured to feed the filament; a deposition head comprising a body and a roller that is rotatably coupled to the body and presses the filament to a surface at a deposition point; a filament guide comprising: (a) a first member having an anterior surface into which a first groove is formed, wherein the first groove is configured to guide the filament in a direction of travel from a first end to a second end of the first groove, wherein the first end is configured to receive the filament from the filament drive, and wherein the second end is configured to provide the filament for deposition, the first member also having a posterior surface into which a cavity is formed, wherein the roller, while pressing the filament, is at least partially situated within at least a portion of the cavity, and (b) a second member that is substantially transparent to electromagnetic radiation and disposed on the anterior surface of the first member, wherein the second member covers at least part of the first groove and provides anterior support for the filament; and Another illustrative apparatus for additive manufacturing with a filament comprises: a roller that presses the filament, when heated by electromagnetic radiation, to a surface at a deposition point; a first member having an anterior surface into which a first groove is formed, wherein the first groove is configured to guide the filament in a direction of travel from a first end to a second end of the first groove, wherein the first end is configured to receive the filament from a source, the first member also having a posterior surface into which a cavity is formed, wherein the roller, while pressing the filament, is at least partially situated within at least a portion of the cavity, and the first member also having a notch that is in alignment with the first groove and extending from a bottom edge of the anterior surface toward the second end of the first groove, wherein the notch is configured to guide the filament from the second end of the first groove through the cavity and toward the deposition point; and a second member that is substantially transparent to the electromagnetic radiation and disposed on the anterior surface of the first member, wherein the second member covers at least part of the first groove and provides anterior support for the filament.

An illustrative guide for providing a filament to a deposition point comprises: a first member having an anterior surface into which a first groove is formed, wherein the first groove is configured to guide the filament in a direction of travel from a first end to a second end of the first groove, wherein the first end is configured to receive the filament from a source, the first member also having a posterior surface into which a cavity is formed, wherein the cavity is shaped to accommodate a roller such that the roller, while pressing the filament at the deposition point, is at least partially situated within at least a portion of the cavity, and the first member also having a notch that is adjacent to the cavity and that is in alignment with the first groove and extending from a bottom edge of the anterior surface toward the second end of the first groove, wherein the notch is configured to guide the filament from the second end of the first groove, through at least a portion of the cavity, and toward the deposition point; a second member that is substantially transparent to electromagnetic radiation and disposed on the anterior surface of the first member, wherein the second member covers a downstream portion of the first groove in relation to the direction of travel and provides anterior support for the filament; and a third member disposed on the anterior surface of the first member upstream from the second member in relation the direction of travel, wherein the third member covers an upstream portion the first groove and provides anterior support for the filament.

BRIEF DESCRIPTION OF THE DRAWINGS

FIGS. 3A through 3D depict illustrations of filament guide 202, in which FIG. 3A depicts a front view, FIG. 3B depicts a bottom view, FIG. 3C depicts a side view, and FIG. 3D depicts a perspective view, of filament guide 202.

FIGS. 4A through 4E depict illustrations of guide member 301 of filament guide 202, in which FIG. 4A depicts a front view, FIG. 4B depicts a bottom view, FIG. 4C depicts a side view, FIG. 4D depicts a perspective view, and FIG. 4E depicts a rear view, of guide member 301.

FIGS. 5A through 5C depict illustrations of a cross section of a lower portion of filament guide 301.

FIG. 7 depicts an arrangement of guide member 301 and roller 204.

DETAILED DESCRIPTION

For the purposes of this specification, the following terms and their inflected forms are defined as follows:

The term "cavity" is defined as an empty space within a solid object.

The term "groove" is defined as a long, narrow depression, including one made to guide motion or movement.

The term "to guide" is defined to mean "direct the motioning of (something)."

The term "member" is defined as a constituent piece of a complex structure.

The term "notch" is defined as an indentation or incision on an edge or surface.

The term "proximal" is defined as being situated close to.

The filament guide of the illustrative embodiment is described in this specification in the context of guiding thermoplastic filament toward a deposition point in an additive manufacturing system. As those who are skilled in the art will appreciate, however, after reading this specification, the disclosed filament guide can be used in various other applications, and with either filaments or other slender threadlike objects or fibers. For example and without limitation, any heating or welding process based on electromagnetic radiation (e.g., infrared-based, ultraviolet-based, visible light-based, microwave-based, etc.) can benefit from a filament guide that is transparent to the working wavelength (i.e., the wavelength of the heating or welding source). Non-limiting examples of such applications include applying wood veneer to furniture (or anything else that requires a ribbon with hot melt glue to be heated), bonding plastic coated wires to plastic pipes (e.g., for integral antennas used in the oil and gas industry, etc.), and processing composite tapes in automated fiber placement (thermoset or thermoplastic).

A set of x-y-z coordinate axes is provided on each figure, as applicable, and having the same frame of reference across the figures. In particular, the x-axis is orthogonal to groove 307 of, and pointing sideways with respect to, guide member 301 of filament guide 202; the y-axis is parallel to groove 307; and the z-axis is orthogonal to the front surface of guide member 301 (and plate 302), pointing in the anterior direction of the guide member.

Figure 1:
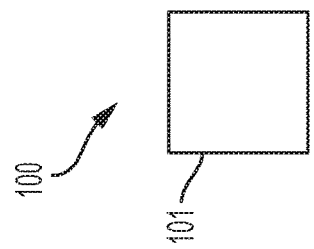
FIG. 1 depicts an illustration of the salient components of additive manufacturing system 100 in accordance with the illustrative embodiment of the present invention.
Figure 1:
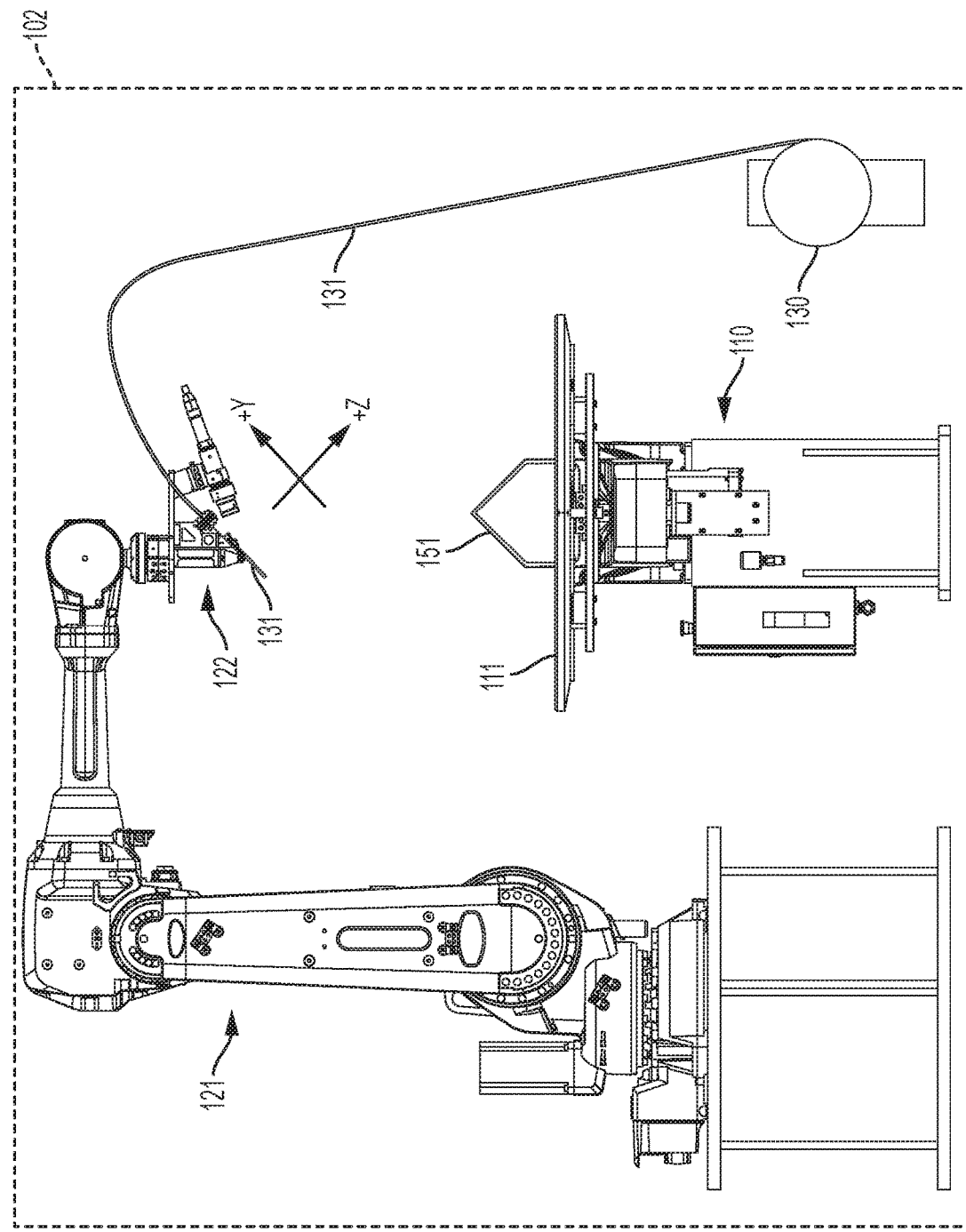

FIG. 1 depicts an illustration of the salient components of additive manufacturing system 100 in accordance with the illustrative embodiment of the present invention. Additive manufacturing system 100 comprises: controller 101, build chamber 102, turntable 110, deposition platform 111, robot 121, deposition head 122, filament source 130, and thermoplastic filament 131. A purpose of manufacturing system 100 is to manufacture object 151, which is an article of manufacture or an apparatus.

Controller 101 comprises the hardware and software necessary to direct build chamber 102, robot 121, deposition head 122, and turntable 110, in order to manufacture object 151. The controller also directs at least some of the components that are part of deposition head 122, as described below. Controller 101 comprises computer-aided design/computer-aide manufacturing (CAD/CAM) functionality in order to control the aforementioned components. It will be clear to those skilled in the art, after reading this disclosure, how to make and use controller 101.

Build chamber 102 is a thermally-insulated, temperature-controlled environment in which object 151 is manufactured. It will be clear to those skilled in art how to make and use build chamber 102.

Turntable 110 comprises a stepper motor under the control of controller 101 that is capable of rotating platform 111 (and, consequently object 151) around an axis of rotation. In particular, turntable 110 is capable of:
  i. rotating platform 111 clockwise around the axis of rotation from any angle to any angle, and
  ii. rotating platform 111 counter-clockwise around the axis of rotation from any angle to any angle, and
  iii. rotating platform 111 at any rate, and
  iv. maintaining (statically) the position of platform 111 at any angle.

In some embodiments of the present invention, turntable 110 is further capable of being positioned in general (i.e., not being limited to rotation around the aforementioned axis), under the control of controller 101, and accordingly is sometimes referred to as a "build plate positioner." It will be clear to those skilled in the art how to make and use turntable 110.

Platform 111 comprises hardware on which object 151 is manufactured. Platform 111 is configured to receive heated filament deposited by deposition head 122. In some embodiments, platform 111 is referred to as a "build plate."

As those who are skilled in the art will appreciate, platform 111 need not be coupled to a turntable, in order for it to receive the heated filament. In any event, it will be clear to those skilled in the art how to make and use platform 111.

Robot 121 is capable of depositing a run of material from any three-dimensional coordinate in build chamber 102 to any other three-dimensional coordinate in build chamber 102 with deposition head 122 at any approach angle. To this end, robot 121 comprises a multi-axis (e.g., six-axis, seven-axis, etc.), mechanical arm under the control of controller 101. A non-limiting example of robot 121 is the IRB 4600 robot offered by ABB. It will be clear to those skilled in the art how to make and use robot 121.

Deposition head 122 comprises hardware that is under the control of controller 101 and that deposits filament 131, which may partially or wholly contain one or more fiber strands. Deposition head 122 is described below and in regard to FIG. 2. Deposition head 122 is an example of an "end effector" in relation to robot 121, being attached to robot 121 at the robot's wrist.

Thermoplastic filament 131 comprises a cylindrical tow-preg of continuous 12K carbon fiber that is impregnated with a thermoplastic and is supplied from filament source 130 (e.g., a spool, etc.). In some alternative embodiments, filament 131 is impregnated with something other than, or in addition to, a thermoplastic. It will be clear to those skilled in the art, after reading this disclosure, how to make and use alternative embodiments of the present invention in which thermoplastic filament 131 has a different fiber composition, such as one described in U.S. patent application Ser. No. 14/184,010, which is incorporated by reference herein.

Thermoplastic filament 131 is deposited as a "run of material" onto object 151 or platform 111, or both. For purposes of clarity, filament 131 is depicted in FIG. 1 as being separate from object 151. The particular shape of object 151 as depicted has been selected for pedagogical purposes; however, additive manufacturing system 100 is capable of building any of a variety of objects.

Figure 2:
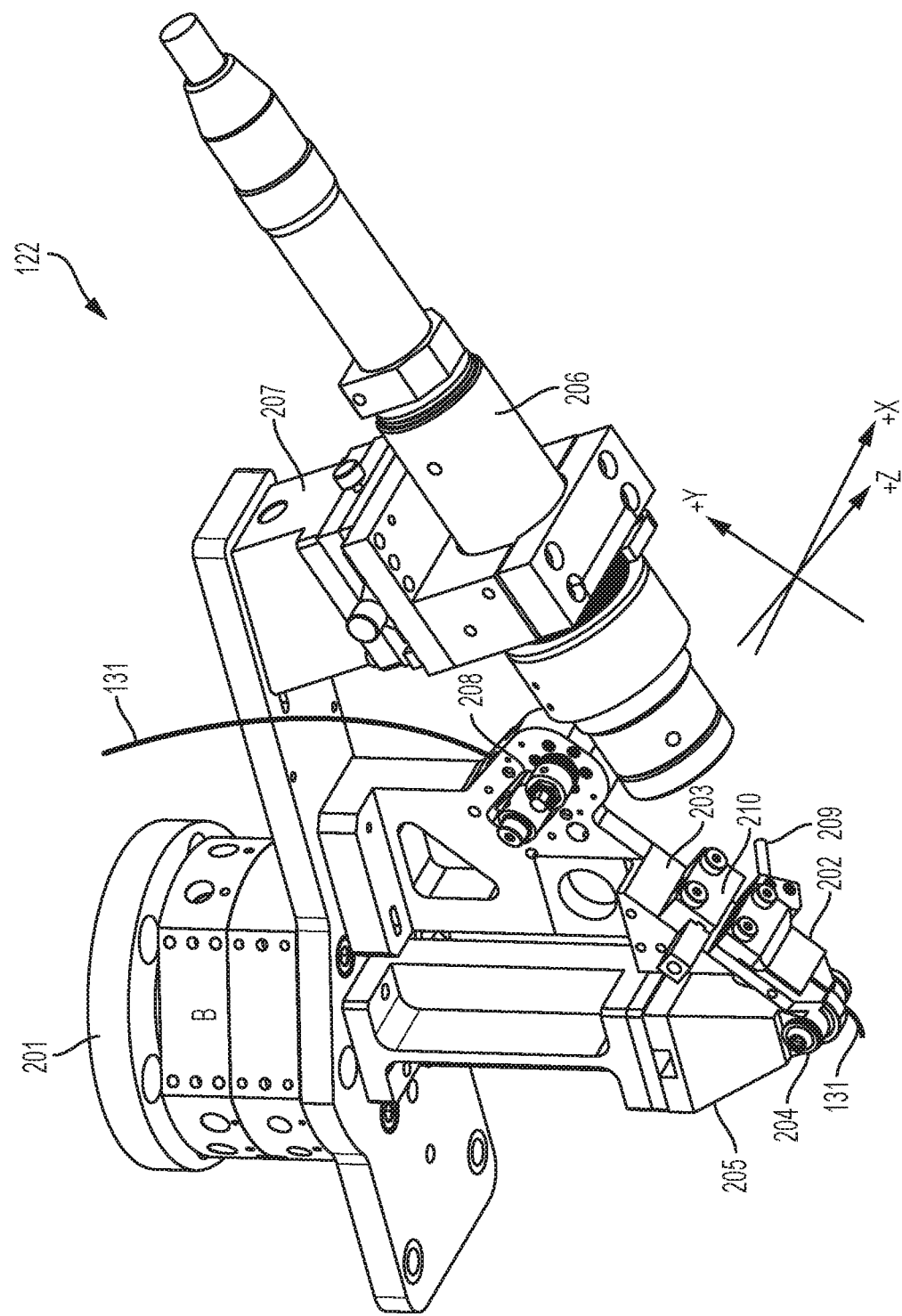
FIG. 2 depicts an illustration of deposition head 122, which includes filament guide 202.

FIG. 2 depicts an illustration of deposition head 122. Deposition head 122 comprises: mount 201, filament guide 202, filament guide support 203, roller 204, deposition head body 205, heat source 206, heat source support 207, filament drive 208, conduit 209, and cutter 210, interconnected as shown. As those who are skilled in the art will appreciate after reading this specification, one or more of the elements that are depicted as being part of deposition head 122 can instead be part of robot 121 or a different part of additive manufacturing system 100.

Mount 201 of deposition head 122 comprises one or parts that are configured to mount the other components of deposition head 122 to the arm of robot 121.

Filament guide 202 is configured to guide filament 131 provided by filament source 130, toward deposition surface 621 at deposition point 622 (depicted in FIG. 6), in accordance with the illustrative embodiment. Filament guide 202 comprises a plate through which filament 131 can be heated, as described below and in regard to FIGS. 3A through 3D. The filament guide is attached to mount 201 via support 203.

In order to deposit filament 131, roller 204 is configured to apply a pressing force between i) filament 131, when heated, and ii) deposition surface 621, which can be a surface of platform 111 or a surface of object 151. The pressing force is generated via the arm of robot 121 being controlled by controller 101. For the purposes of this specification, deposition point 622, by definition, is always "under" the roller at the point of deposition, as opposed to being at a fixed point or area on platform 111 or object 151. The deposition point is part of surface 621. Roller 204 is attached to mount 201 via body 205 and is rotatably coupled to body 205. In some embodiments of the present invention, body 205 is attached to mount 201 via an intermediate support member.

Heat source 206 is a heating device configured to heat filament 131 while the filament is moving through guide 202. Heat source 206 comprises a laser, configured to emit electromagnetic radiation in the form of infrared light. In some alternative embodiments of the present invention, the laser emits electromagnetic radiation in a different form, while in some other embodiments heat source 206 uses a heat source other than a laser, or emits thermal energy that which might be in a form other than electromagnetic radiation, or both.

The particular source of the heat is sufficient to heat the thermoplastic in a portion of filament 131 prior to the portion reaching deposition point 622. When heated in this way by heat source 206, the thermoplastic in the filament becomes pliable and adhesive, and can be pressed and deposited by roller 204. The heat source is configured to produce a temperature at filament 131 that is high enough to make the thermoplastic pliable and adhesive, but not too high. If the thermoplastic is too cool, it is not sufficiently pliable or adhesive, and if the thermoplastic is too hot, it melts and its viscosity becomes too low. When filament 131 is moving continuously, heat source 206 heats a continuum of affected portions of the filament.

Heat source 206, including the laser, is controlled by controller 101. The heat source is attached to mount 201 via support 207.

Filament drive 208 is configured to feed filament 131 at a feed velocity controlled by controller 101. Drive 208 feeds the filament forward, in particular toward and through filament guide 202. The feed velocity is important in regard to design considerations of filament guide 202 as described below, as well as in regard to other reasons. In some embodiments of the present invention, drive 208 is attached to mount 201 via its own support member.

Conduit 209 is configured to provide a gas from a source of the gas to filament guide 202, in particular to filament 131 within guide 202. In some embodiments of the present invention, the gas that is used has properties enabling it to displace oxygen such that combustion is inhibited when filament 131 is heated by heat source 206. For example and without limitation, the gas can be nitrogen. Conduit 209 is connected to filament guide 202 as described below.

Cutter 210 comprises a cutting mechanism that is configured to cut filament 131, as needed and under the control of controller 101. The cutting mechanism is constructed and arranged to cut filament 131 at a location at or near, or upstream from, filament guide 202.

Figure 3A:
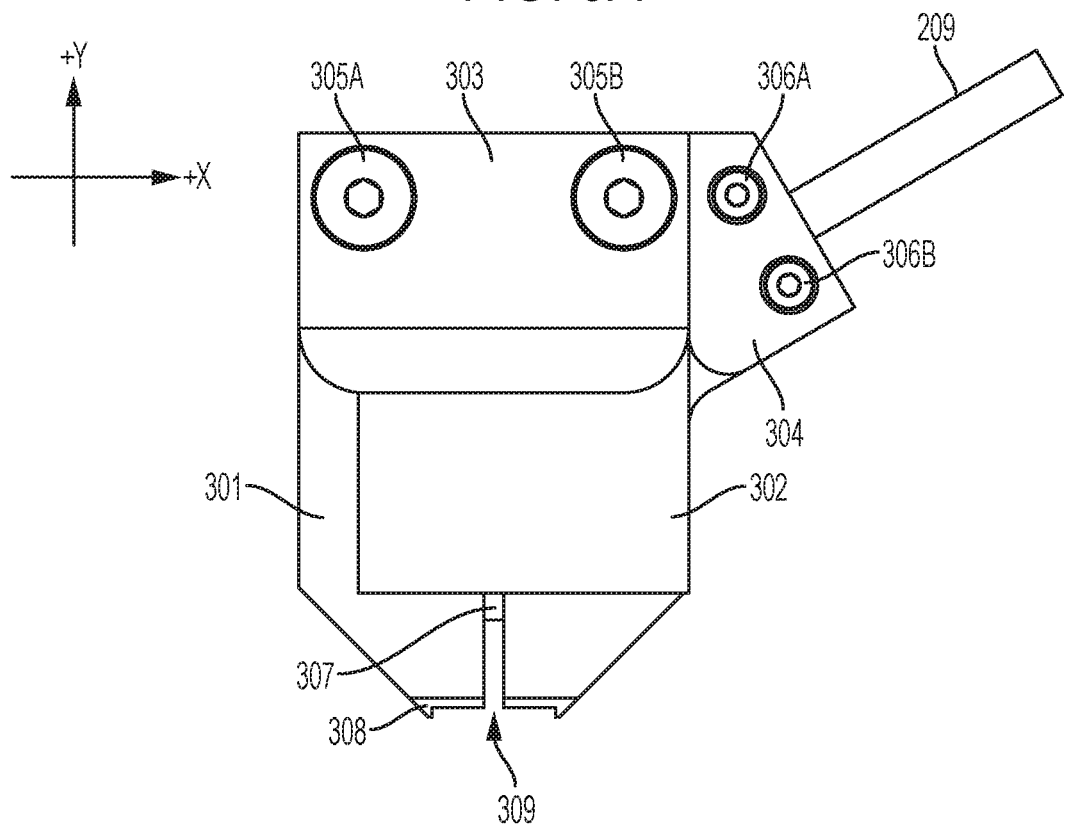
Figure 3B:
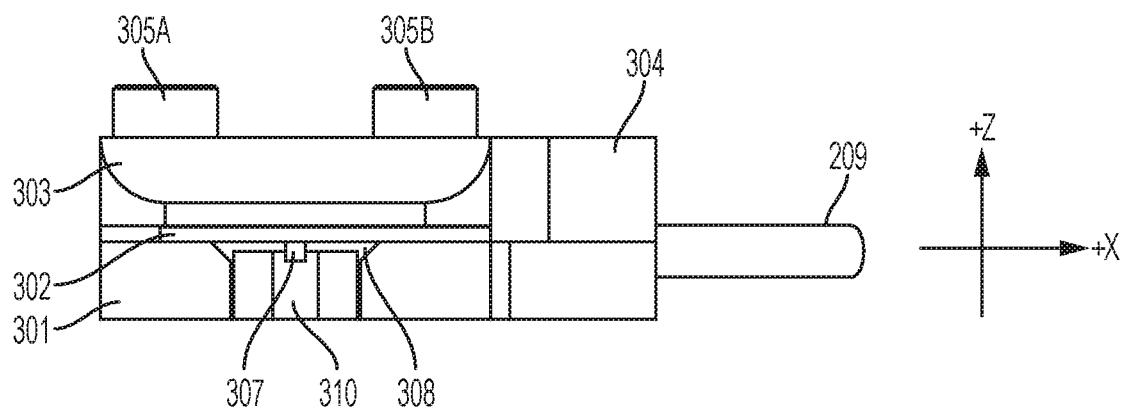
Figure 3C:
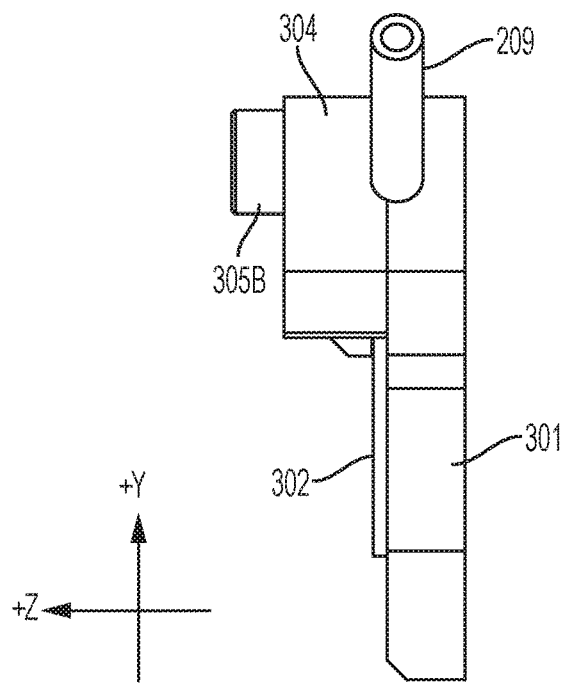
Figure 3D:
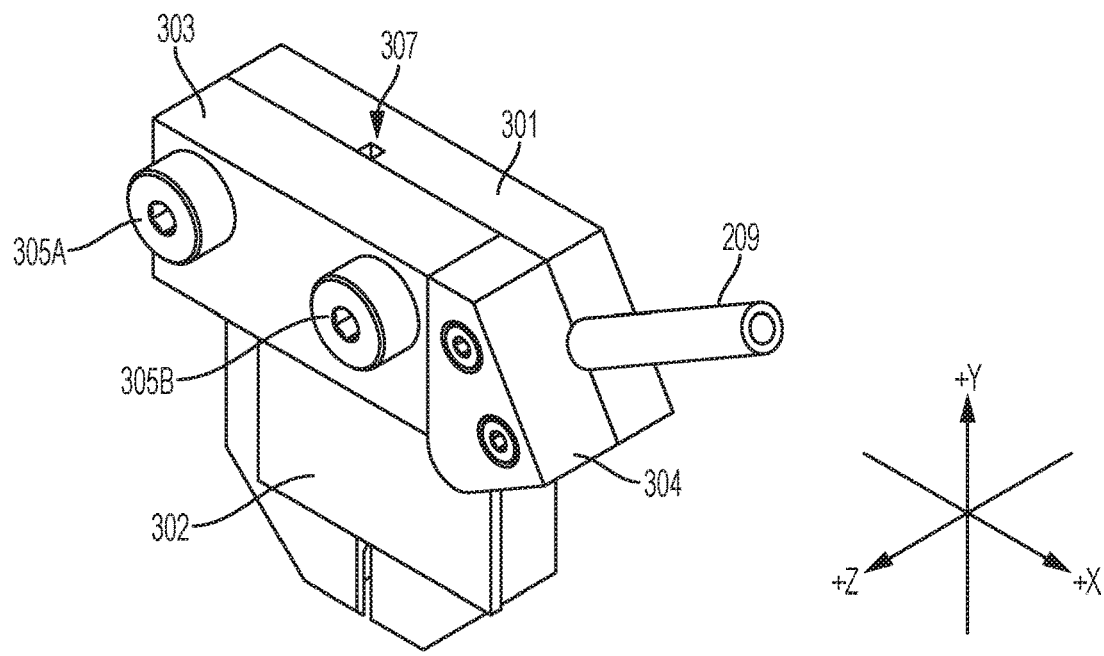

FIGS. 3A through 3E depict illustrations of filament guide 202, in which FIG. 3A depicts a front (or "anterior") view, FIG. 3B depicts a bottom view, FIG. 3C depicts a side view, FIG. 3D depicts a perspective view, and FIG. 3E depicts a back (or "posterior") view, of filament guide 202.

As can be seen in FIG. 3A, filament guide 202 comprises guide member 301 (or "first member"), plate 302 (or "second member"), shielding member 303 (or "third member"), and retaining member 304 (or "fourth member"), interrelated as shown. In accordance with the illustrative embodiment, filament guide 202 is comprised of multiple elements that are physically distinct from one another as depicted FIGS. 3A through 3D. However, in some alternative embodiments of the present invention, filament guide 202 can be made of fewer (or more) physically distinct parts as described below.

Guide member 301 is configured to guide filament 131 along a path of travel, defined by filament groove 307. Guide member 301, including filament groove 307, is depicted in further detail below and in regard to FIGS. 4A through 4D.

Plate 302 covers a lower (downstream) portion of groove 307 while enabling filament 131 to be heated, while in groove 307, by heat source 206. By covering filament 131 in groove 307, plate 302 provides anterior support for the filament, keeping filament 131 in the groove and preventing it from separating from the groove in the anterior direction.

In accordance with the illustrative embodiment, element 302 is a plate. In some alternative embodiments of the present invention, and as those who are skilled in the art will appreciate after reading this specification, element 302 can be an object other than a plate such as a lens, for example and without limitation.

In order to enable filament 131 to be heated, plate 302 is composed of a material that makes the plate substantially transparent to electromagnetic radiation emitted by heat source 206. In accordance with the illustrative embodiment, plate 302 is composed of fused quartz, thereby providing sufficient transparency to the electromagnetic radiation and making the plate transmissive to the electromagnetic radiation. In particular, fused quartz has a transparency of greater than 90% at the wavelength of the laser of heat source 206 (970 nm). With laser-based heating as in the illustrative embodiment, only one wavelength need be considered in regard to transparency of plate 302, although other potential heat sources, such as an infrared lamp or a visible-light source, might require a wider band to be considered for transparency purposes.

For example and without limitation, plate 302 can be adapted from a microscope slide made of fused quartz, and cut to suitable dimensions accordingly. An example of a suitable microscope slide is offered by Technical Glass Products and can be found at the following Internet address: www.technicalglass.com/product_pages/machined_quartz/microscope_slides.html, wherein the information on the corresponding web page is incorporated by reference herein.

Plate 302 is dimensioned so as to retain filament 131 within groove 307 while enabling the filament to travel along at least the lower portion of the groove. Plate 302 is also dimensioned so as to provide sufficient electromagnetic radiation transparency with respect to time, in order to heat each affected portion of filament 131 to a sufficient temperature as the filament travels along groove 307.

In particular, plate 302 has to be long enough along the path of travel of filament 131, in order to enable heat source 206 to heat a portion of the filament prior to the portion reaching deposition point 622. Accordingly, the dimension of plate 302 along the path of travel in groove 307 can be determined based on the feed velocity, or on the intensity of the thermal energy (e.g., electromagnetic radiation emitted by the laser of heat source 206, etc.) emitted by heat source 206 and reaching the plate, or on both the feed velocity and the intensity.

As those who are skilled in the art will appreciate after reading the specification, one or more dimensions of plate 302 can be based on other factors instead of or in addition to feed velocity and intensity of the thermal energy. For example, as depicted (e.g., in FIG. 3A, etc.) the width of plate 302 is based on a one-inch-wide, commercially available microscope slide; however, as those who are skilled in the art will appreciate after reading this specification, plate 302 can span the full width of guide member 301, or can be centered with respect to guide member 301 and/or groove 307, or both.

Plate 302 is held in position on guide member 301 by shielding member 303, as described below. In some alternative embodiments of the present invention, plate 302 can be held in position by one or more dedicated fasteners.

Shielding member 303 covers an upper (upstream) portion of groove 307. In doing so, shielding member 303 both retains filament 131 within the upper portion of the groove and protects filament 131 from thermal energy emitted by heat source 206 until the filament passes into the lower portion of groove 307 covered by plate 302. In order to protect filament 131 from premature heating, shielding member 303 is composed of a material that makes the shielding member heat resistant, as described below.

Additionally, shielding member 303 clamps and retains plate 302 to the front surface and lower portion of guide member 301, by pressing the plate against the guide member. This is apparent in FIG. 3C in particular, in which plate 302 is depicted as being sandwiched between shielding member 303 and guide member 301.

Shielding member 303 is dimensioned so as to retain filament 131 within groove 307 while the filament is traveling along the upper portion of the groove. Shielding member 303 is also dimensioned so as to enable plate 302 with sufficient space through which the thermal energy from heat source 206 may pass, as described above.

In some embodiments of the present invention, an upper region of shielding member 303 that is coincident with the upper end of groove 307, when fastened to guide member 301, is cut or shaped into a conical or funnel shape, or similar shape. The wider part of this shape permits a new cut of filament 131, as cut by cutter 210, to be more easily threaded into groove 307.

In accordance with the illustrative embodiment, shielding member 303 is physically distinct from guide member 301, plate 302, and retaining member 304. As those who are skilled in the art will appreciate after reading this specification, however, shielding member 303 can be part of guide member 301 or retaining member 304, or both.

Retaining member 304 is configured to retain conduit 209 within opening 311. Retaining member 304 can be composed of the same material as shielding member 303 or a different, suitable material for retaining conduit 209. In some embodiments of the present invention, retaining member 304 is cut such that its side that faces conduit 209 conforms to the conduit while enabling conduit 209 to be retained within opening 311. This is apparent in FIG. 3C in particular. Retaining member 304 is fastened to guide member 301 by fasteners 306A and 306B.

One or more of guide member 301, shielding member 303, and retaining member 304 are made from a material whose key properties are one or more of i) heat resistance, as at least guide member 301 is exposed to direct laser radiation, ii) wear resistance, due to the carbon fiber in filament 131 rubbing against at least guide member 301, and iii) lubricity to prevent fouling due to molten polymer depositing on the surface. In accordance with the illustrative embodiment, one or more of members 301, 303, and 304 are made from aluminum. In some embodiments of the present invention, the material is 6061 aluminum. In some other embodiments of the present invention, one or more of members 301, 303, and 304 are made from a metal that is different than aluminum. A nickel/PTFE (polytetrafluoroethylene) coating such as Poly-Ond® on the (aluminum) surface can be used to achieve the aforementioned property of lubricity.

Figure 4A:
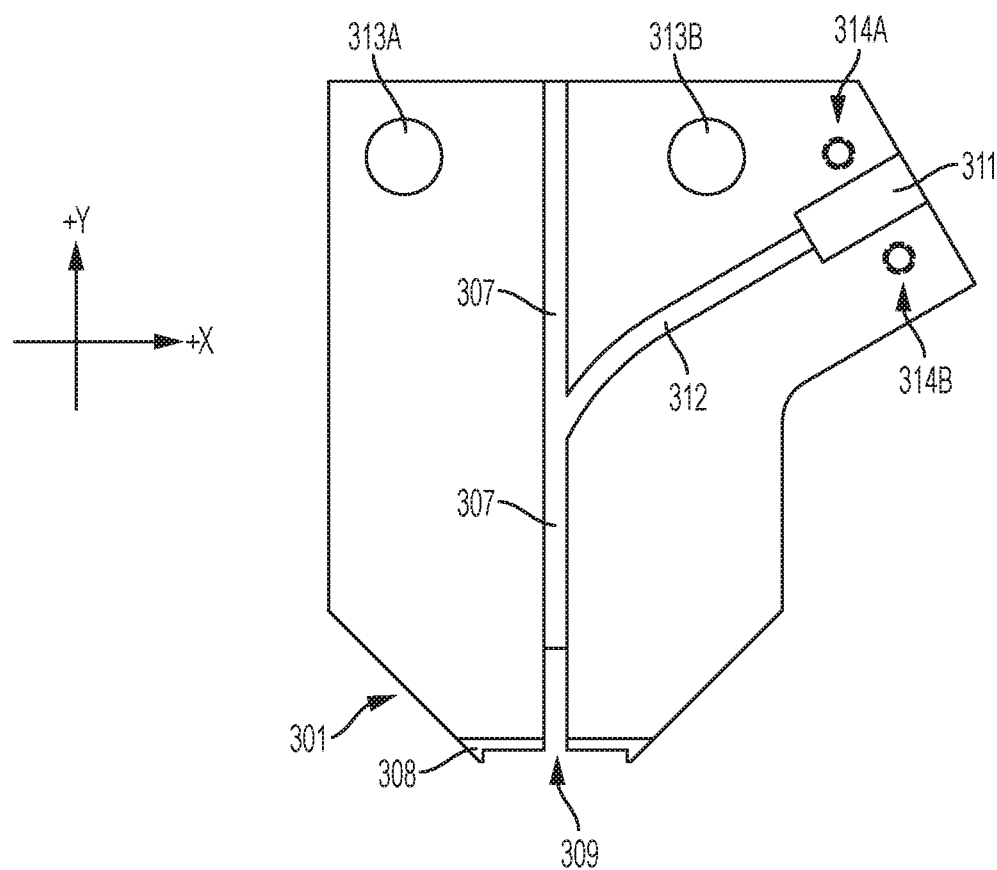
Figure 4B:
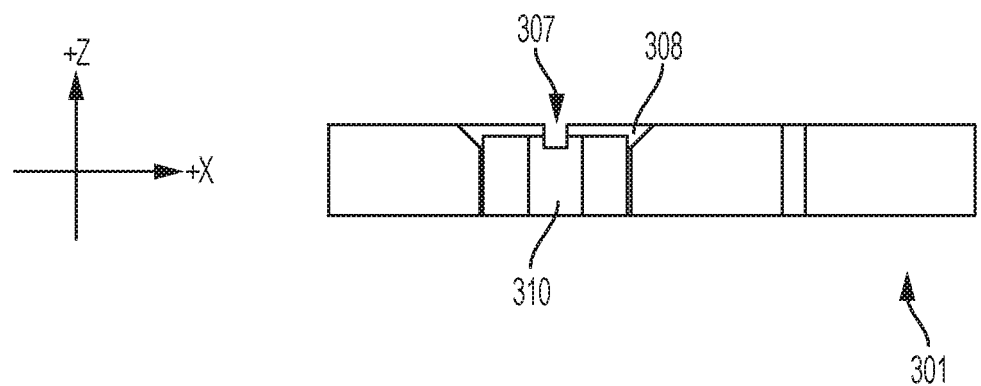
Figure 4C:
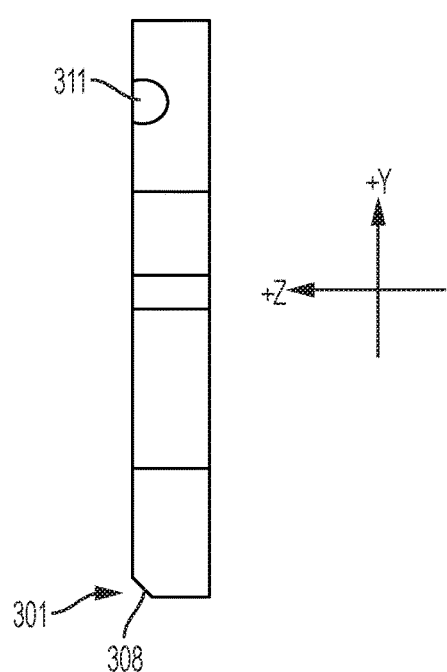
Figure 4D:
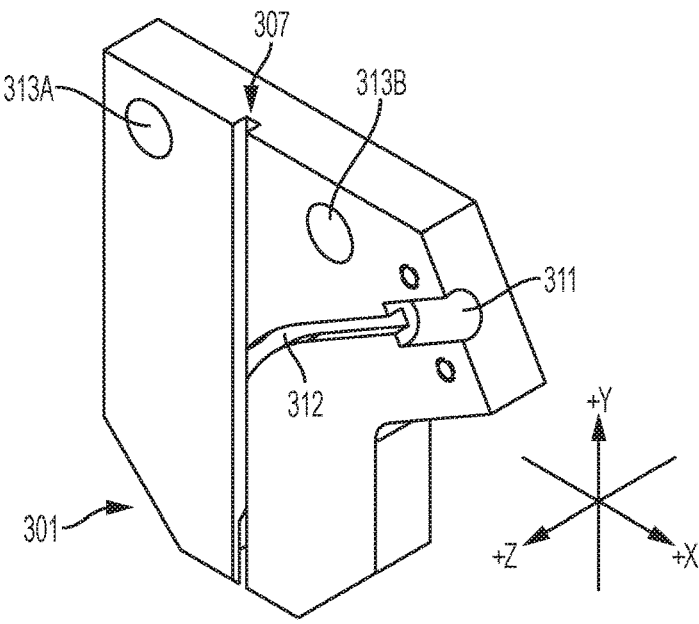
Figure 4E:
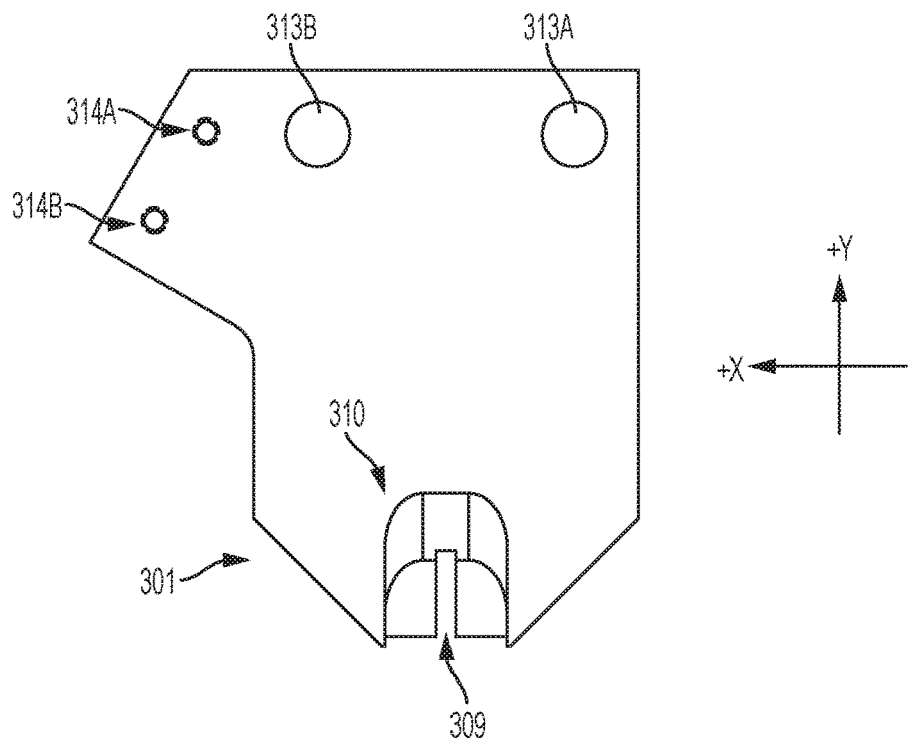

FIGS. 4A through 4E depict illustrations of guide member 301, in which FIG. 4A depicts a front view, FIG. 4B depicts a bottom view, FIG. 4C depicts a side view, FIG. 4D depicts a perspective view, and FIG. 4E depicts a rear view, of guide member 301. As can be seen in the figures, guide member 301 comprises filament groove 307, beveled edge 308, notch 309, cavity 310, opening 311, gas-supply groove 312, and fastener holes 313A, 313B, 314A, and 314B, interrelated as shown. In some embodiments of the present invention, some or all of the fastener holes project all of the way through guide member 301 from front to back, as depicted in FIG. 4E, while in some other embodiments one or more of the fastener holes are open only on the front of the guide member.

Filament groove 307 of guide member 301 is a groove or duct that is configured to guide filament 131 along a path of travel defined by the filament groove. Groove 307 has a first end, or "upper end," configured to receive the filament from filament drive 208 or from some other immediate source of the filament. Groove 307 also has a second end, or "lower end," configured to direct filament 131 toward deposition point 622.

Filament groove 307 has a cross section such that contact between filament 131 and groove 307 is minimized, thereby enabling travel of the filament through the groove. In accordance with the illustrative embodiment, and as can be seen in FIGS. 3B and 4B, groove 307 has a square-shaped cross section (e.g., 1.5 mm by 1.5 mm, etc.), in that the bottom and sides of the cross section are substantially at right angles with respect to each other. In some embodiments of the present invention, the bottom and sides of the cross section are substantially equal in dimension, being at least as wide as filament 131 so as to accommodate the filament. In some other embodiments of the present invention, groove 307 has a triangle-shaped cross section.

Figure 5A:
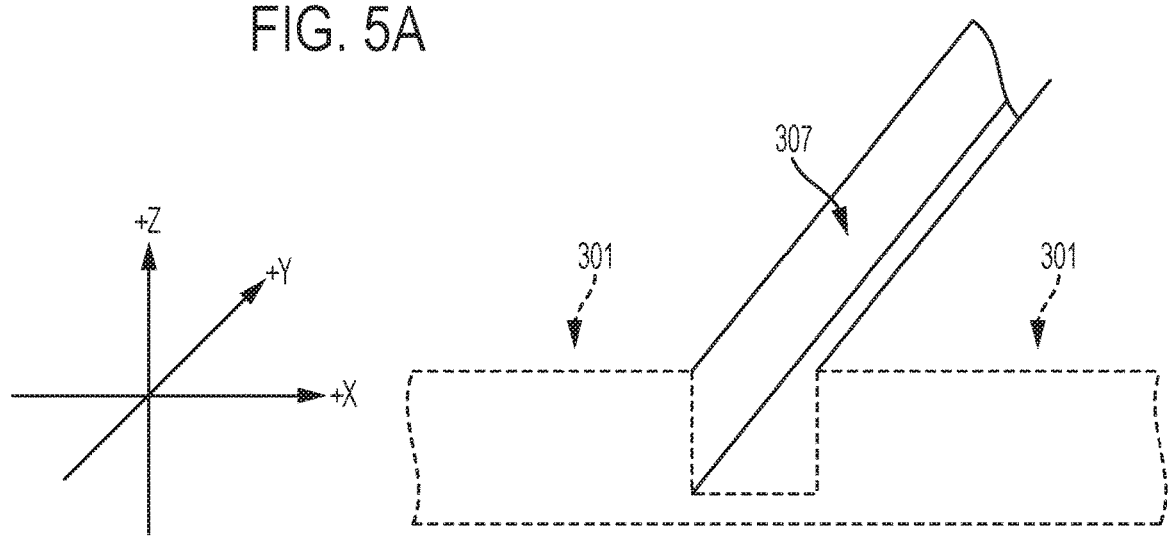
Figure 5B:
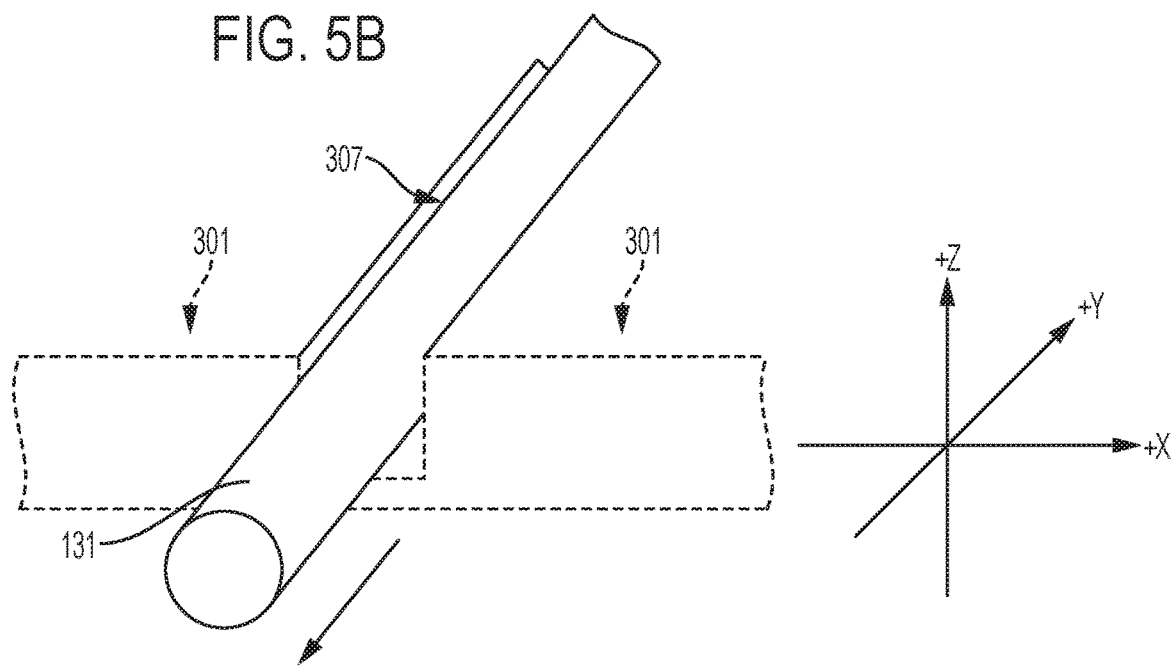

FIGS. 5A through 5C depict illustrations of a cross section of a lower portion of filament guide 301, depicted in order to show greater detail in the cross section of filament groove 307. FIG. 5A depicts detail as described above in regard to a square-shaped cross section of groove 307. FIG. 5B depicts the same detail as in FIG. 5A, along with filament 131 positioned within groove 307 and moving according to a direction of travel as marked by an arrow.

FIG. 5C depicts an embodiment in which mirror portions 501A and 501B of mirror 501 are present. Mirror 501 is configured to reflect the thermal energy provided by heat source 206 toward the inward facing side of filament 131— that is, the side of filament 131 facing away from heat source 206. In particular, mirror 501 is made of a material that is reflective to the type of electromagnetic radiation emitted by heat source 206. In some embodiments, mirror 501 can be made of aluminum, as it reflects infrared radiation. In some other embodiments, one or both of the bottom and sides of groove 307 can be made of a reflective material as well.

As configured, mirror 501 heats the inward facing side of filament 131. In some embodiments of the present invention, each mirror portion 501A and 501B is arranged at an oblique angle with respect to both the sides and bottom of groove 307, wherein the angle and width of each mirror portion are selected so as to achieve the aforementioned heating effect. Mirror portions 501A and 501B can be present throughout i) the run of groove 307 covered by plate 302, ii) a smaller portion of said run, or iii) said at least some of said run and also extending along groove 307 under shielding member 303. The dimensions of mirror portions 501A and 501B are selected to minimize or avoid contact with filament 131.

Gas-supply groove 312 of guide member 301 is a groove or duct that is configured to supply a gas to filament groove 307. Groove 312 has a first end, or "outer end," in the direction of the gas source at the distal end of conduit 209. Groove 312 also has a second end, or "inner end," in the direction of filament groove 307. Groove 312 is configured to provide the gas from conduit 209 to filament groove 307.

Gas-supply groove 312 has a cross section so as to promote the flow of the gas toward filament groove 307. Groove 312 intersects with groove 307 at an acute angle with respect to the direction of travel of filament 131; this is to promote the flow of the gas along the filament as the filament travels along filament groove 131. In some embodiments of the present invention, the inner end of gas-supply groove 312 curves toward the direction of travel of filament 131 as groove 312 approaches groove 307.

Guide member 301 has a rear surface, as depicted in FIG. 4E, into which cavity 310 is formed, in accordance with the illustrative embodiment. Cavity 310 is shaped to accommodate roller 204, in order to bring bottom edge 308 of guide member 301 close to deposition point 622. In particular, guide member 301 is arranged with respect to roller 204 such that the roller, while operating, is disposed at least partially within cavity 310, thereby permitting guide member 301 to be closer to roller than without a cavity being present.

Figure 6:
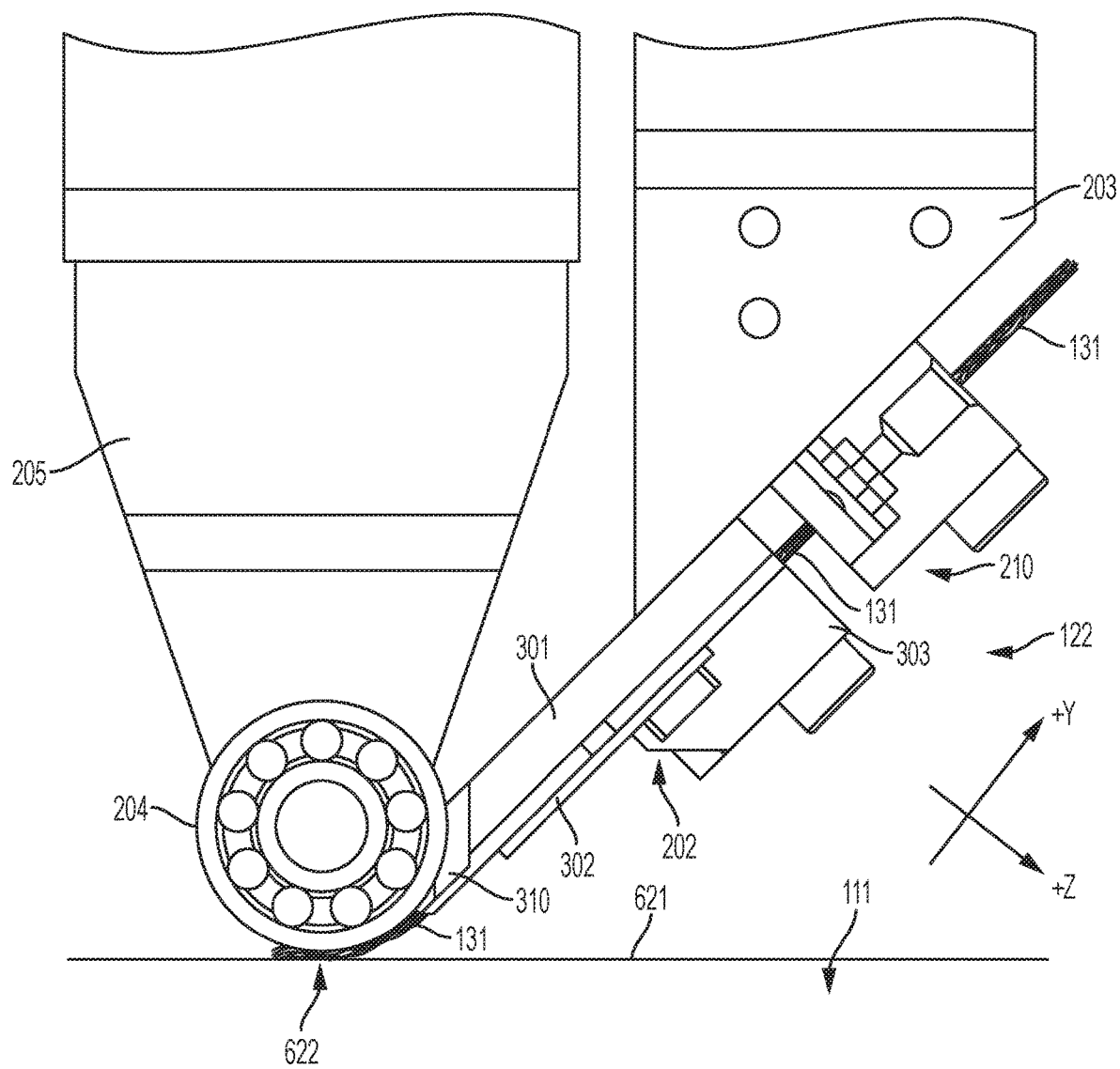
FIG. 6 depicts a lower portion of deposition head 122.

Cavity 310 is formed such that roller 204 rotates freely and without touching the cavity. This is depicted in FIG. 6, which shows a lower portion of deposition head 122, including a partial cutaway view of the bottom of filament guide 202. This view depicts roller 204 being accommodated by cavity 310. Roller 204, while pressing filament 131, is at least partially situated within at least a portion of cavity 310. By having the bottom edge of the guide member being as close as possible to deposition point 622, made possible in part by cavity 310, filament 131 can be deposited as a run of material as close as possible to the intended deposition point that is called for in the design of object 151. For clarity purposes, only portions of filament 131 entering cutter 210, entering filament guide 202, and leaving filament guide 202, are depicted.

In accordance with the illustrative embodiment, bottom edge 308 of guide member 301 is beveled such that the beveled edge conforms to deposition surface 621 proximal to deposition point 622. In particular, the bevel is formed such that edge 308 is substantially parallel to the deposition surface, at least part of the time. The beveled edge also acts to bring bottom edge 308 of guide member 301 close to deposition point 622. In some embodiments of the present invention, bottom edge 308 can be chamfered.

Notch 309 at the lower end of guide member 301 is configured to enable filament 131, when bent via heating, to travel toward deposition point 622, in contrast to the filament contacting surface 621 off-target (e.g., in front of the intended deposition point, etc.). The side portions of guide member 301 on either side of notch 309 act to keep filament 131 centered laterally, thereby further directing the filament toward the intended deposition point. In some embodiments of the present invention, notch 309 has a square cross-section, while in other embodiments of the present invention notch 309 has a rounded (i.e., hourglass) cross-section. In some embodiments of the present invention, the opening created by notch 309 enables at least a portion of a cross section of filament 131, at this point bent by having been heated, to pass through at least a portion of cavity 310 while traveling toward deposition point 622.

In some embodiments of the present invention, as depicted in FIG. 7 and enabled by beveled edge 308, notch 309, and/or cavity 310, at least one point on guide member 301, represented by point 702, extends past the initial point of contact 703 of filament 131 with roller 204, toward deposition point 622. In doing so, guide member 301 provides lateral support of filament 131 to at least the tangent point on the roller as the deposition head moves along its direction of travel with respect to a fixed point on platform 111. In such an embodiment, angle $\theta_1$ along the contact surface of contact roller 204, is less than angle $\theta_2$ along the contact surface. Angle $\theta_1$ is defined by (i) point 701, which is a point on the roller coincident with deposition point 622, and (ii) point 702, and angle $\theta_2$ is defined by (i) point 701 and (ii) point 703, both angles being defined in relation to rotation axis 704 of contact roller 204. In some other embodiments of the present invention, angle $\theta_1$ and angle $\theta_2$ are substantially equal to each other.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A guide for providing a filament to a deposition point, comprising:
    a first member having an anterior surface into which a first groove is formed, wherein the first groove is configured to guide the filament in a direction of travel from a first end to a second end of the first groove, wherein the first end is configured to receive the filament from a source, the first member also having a posterior surface into which a cavity is formed, and the first member also having a notch that is adjacent to the cavity and extending from an edge of the anterior surface toward the second end of the first groove, wherein the notch is configured to guide the filament from the second end of the first groove, through at least a portion of the cavity, and toward the deposition point;
    a second member that is transparent to electromagnetic radiation and disposed on the anterior surface of the first member, wherein the second member covers a downstream portion of the first groove in relation to the direction of travel and provides anterior support for the filament;
    a third member disposed on the anterior surface of the first member upstream from the second member in relation the direction of travel, wherein the third member covers an upstream portion the first groove and provides anterior support for the filament; and
    a first mirror portion arranged at least partially along the first groove and at an oblique angle with respect to both a first side of and a bottom of the first groove.

2. The guide of claim 1 wherein the second member is a plate comprising fused quartz.

3. The guide of claim 1 further comprising a second mirror portion arranged at least partially along the first groove and at an oblique angle with respect to both a second side of and the bottom of the first groove.

4. The guide of claim 1 wherein the first mirror portion is configured to reflect infrared radiation.

5. The guide of claim 4 wherein the first mirror portion is made of aluminum.

6. The guide of claim 1 wherein the first member also has a second groove configured to provide a gas to the first groove.

* * * * *